Dec. 15, 1970  A. F. STARKLE  3,547,493
DEVICE FOR CUTTING SLITS IN TUNNEL LININGS
Filed May 1, 1969  5 Sheets-Sheet 4
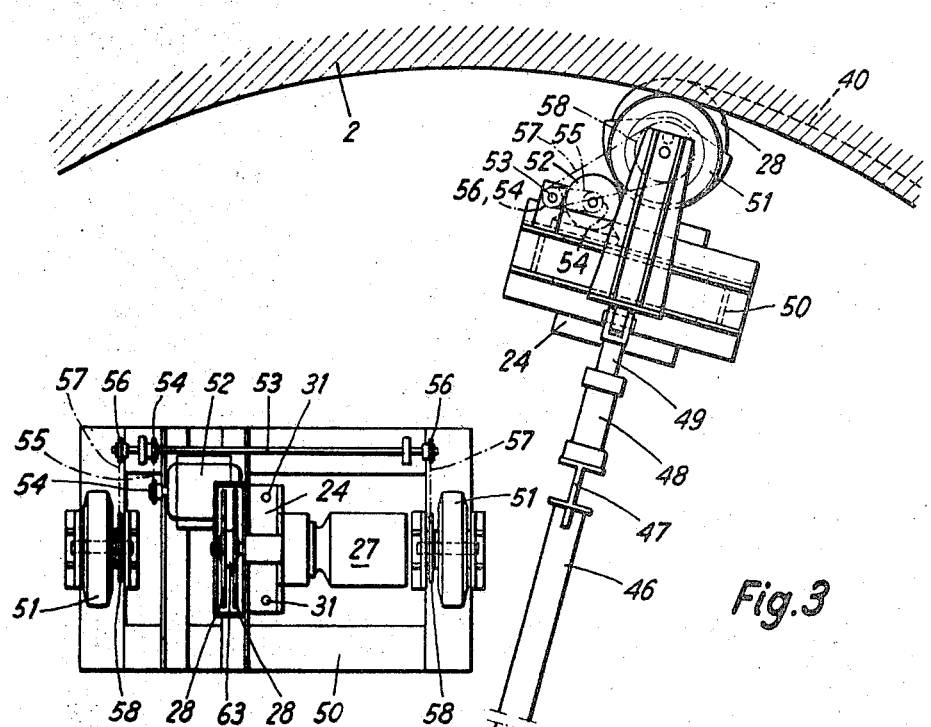
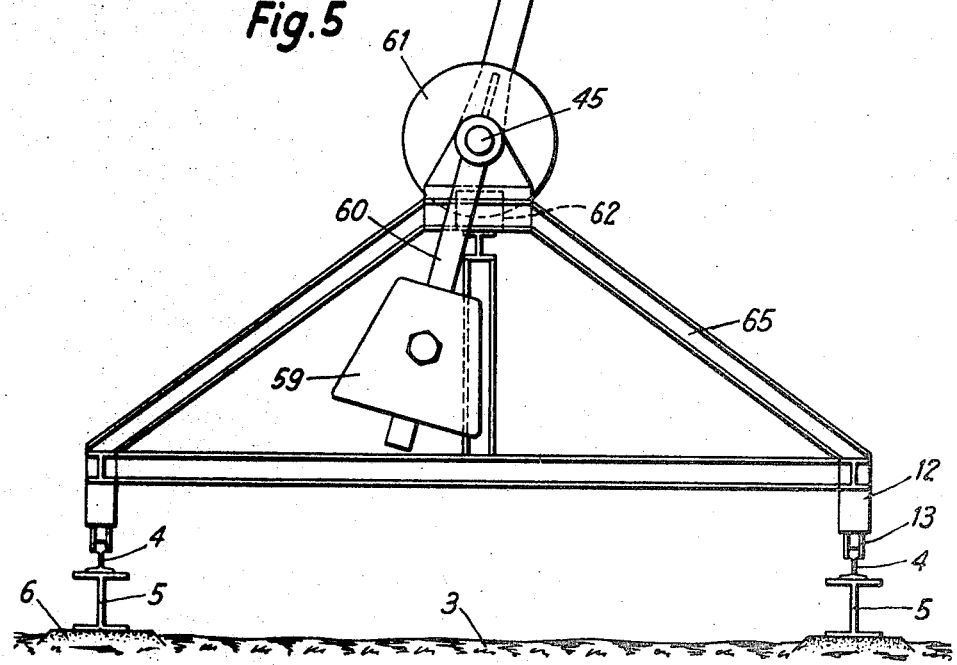
INVENTOR:
AUGUST F. STÄRKLE
BY
Howson & Howson
ATTYS.

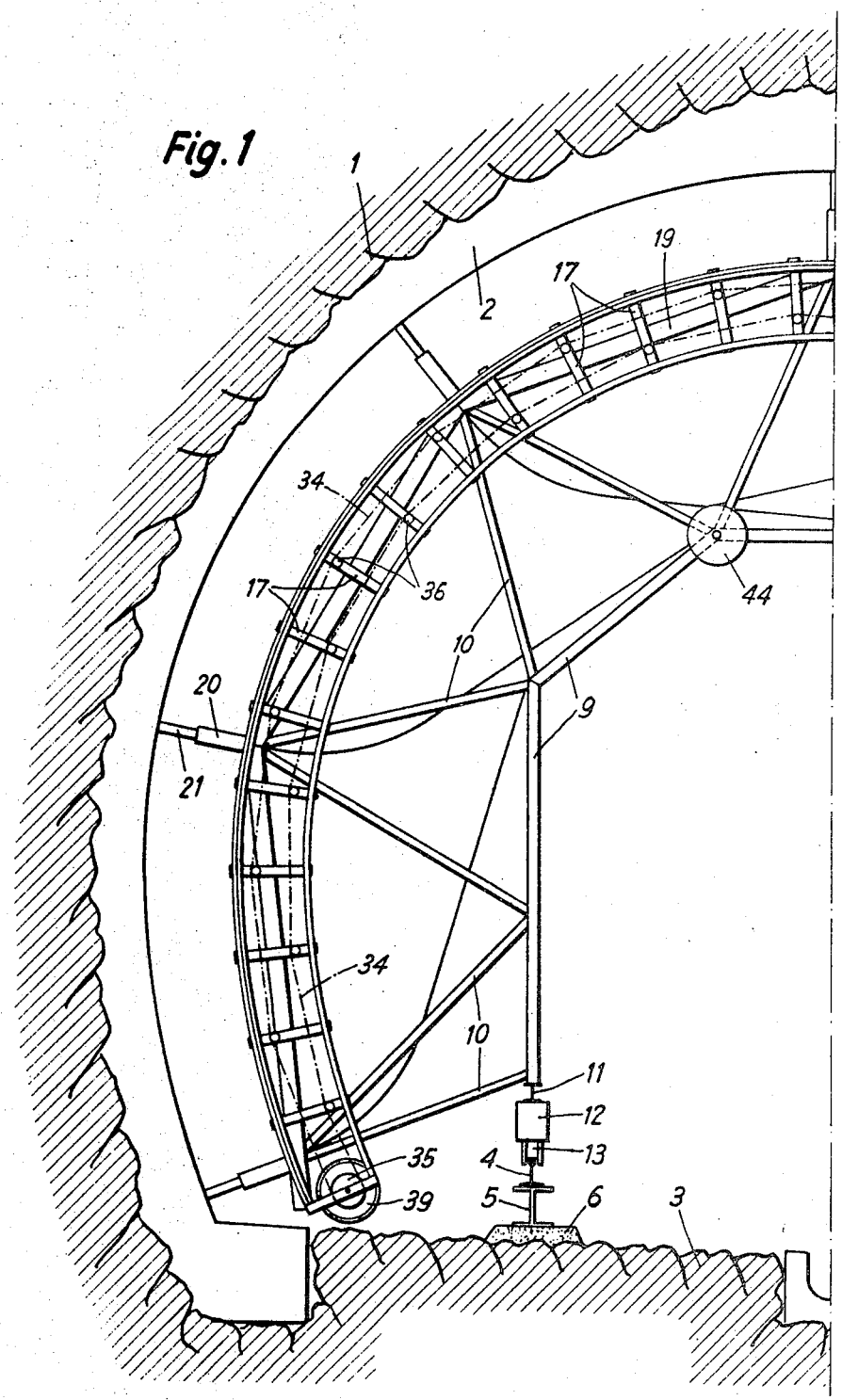

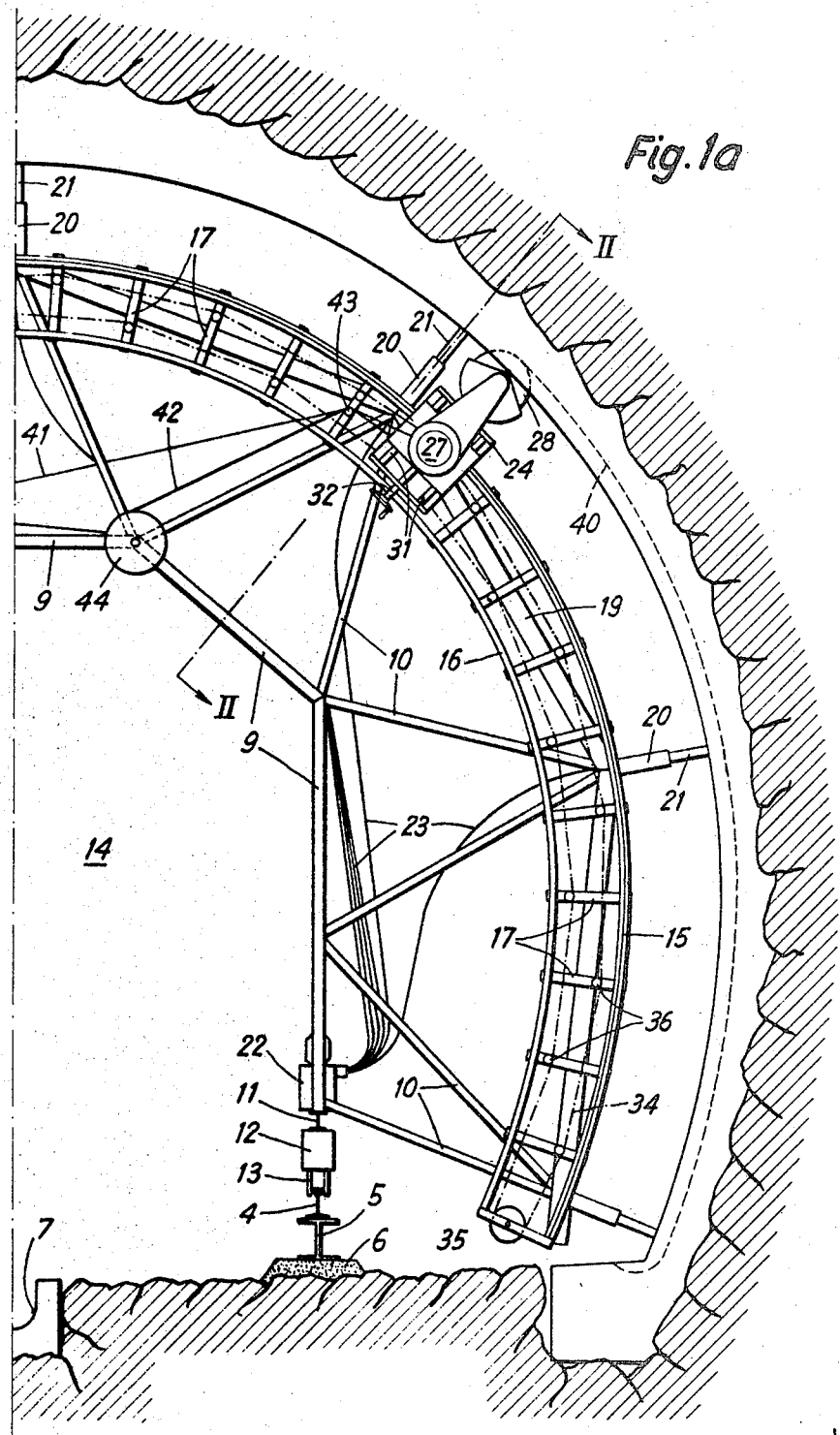

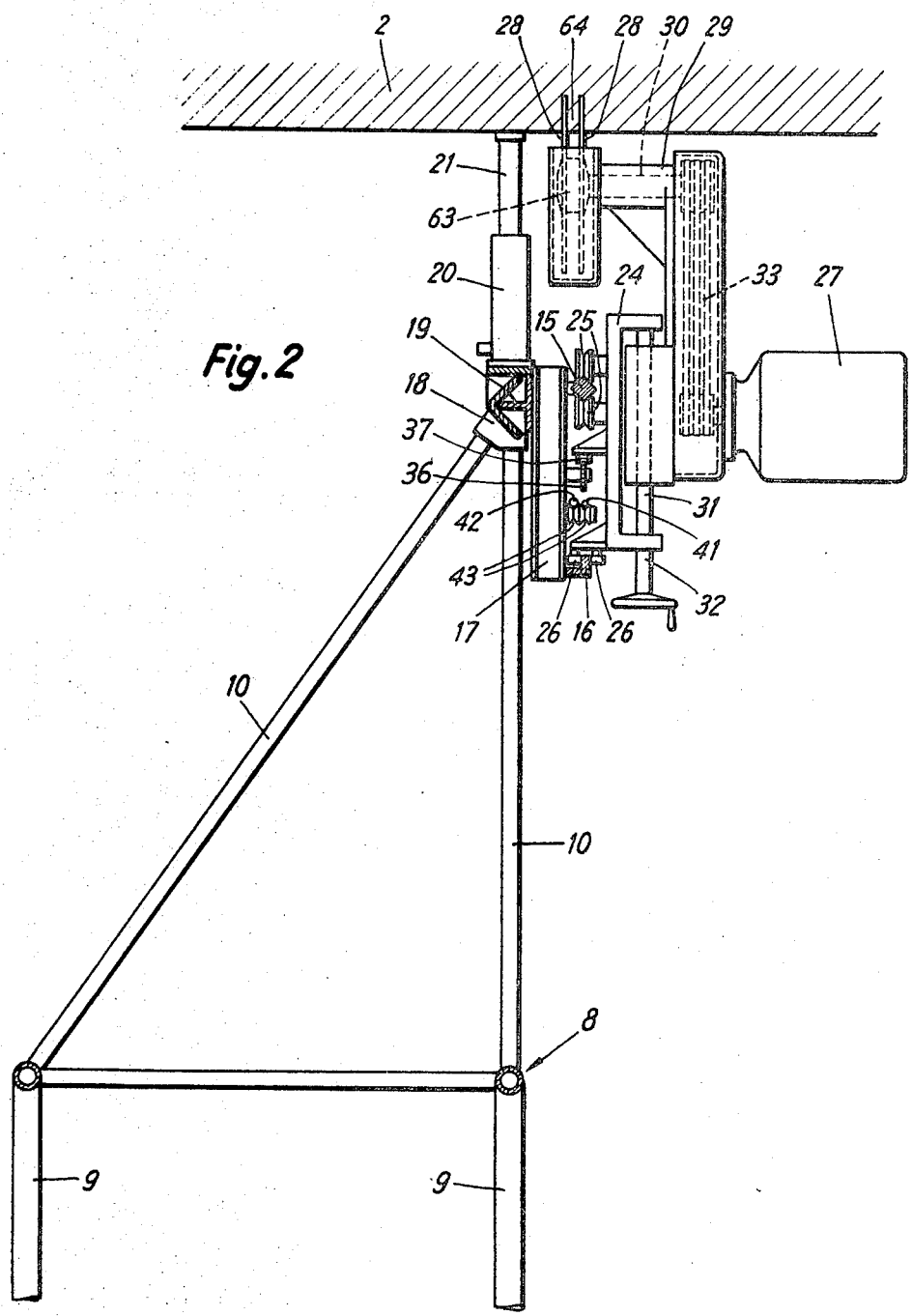

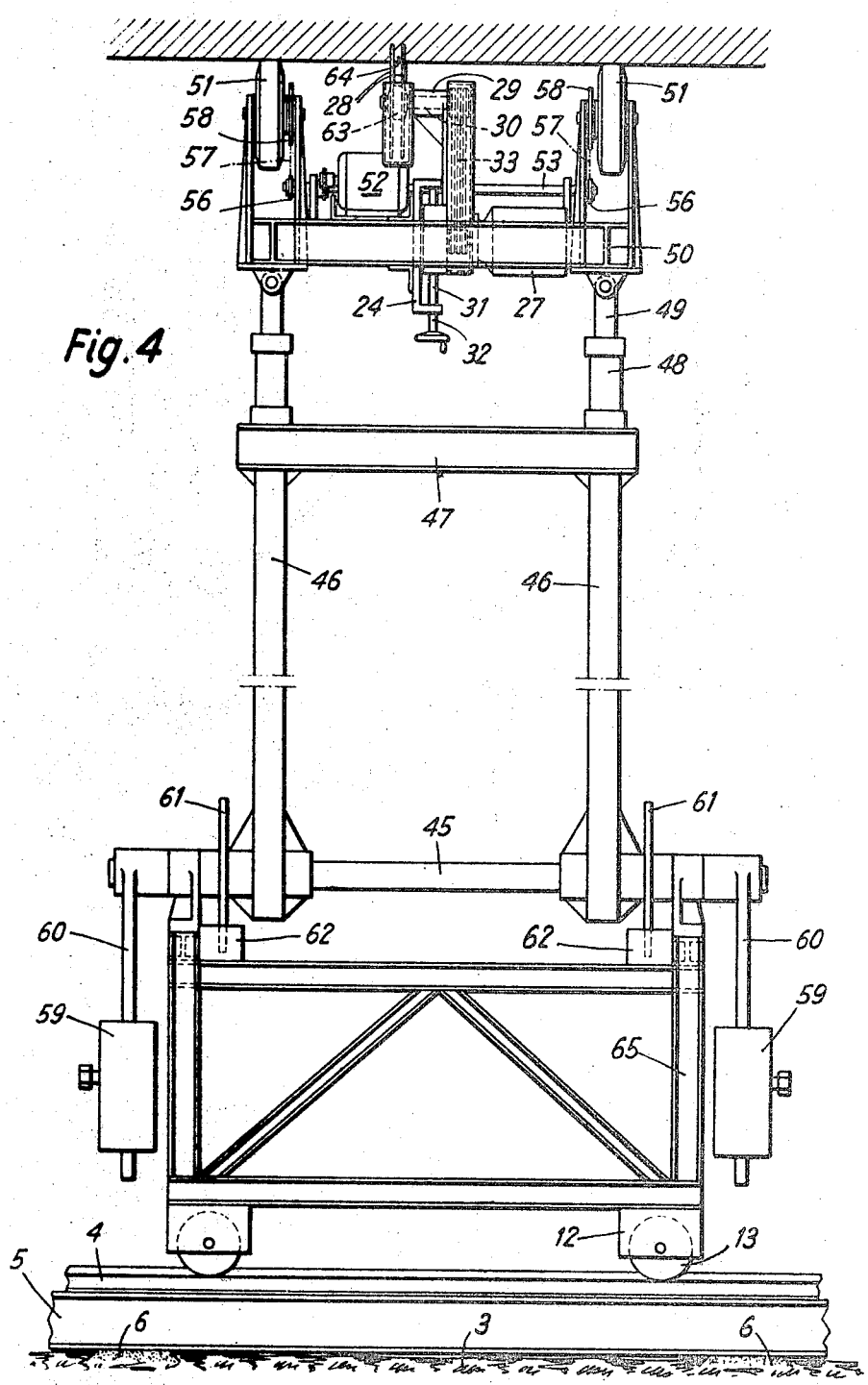

# United States Patent Office 3,547,493
Patented Dec. 15, 1970

3,547,493
DEVICE FOR CUTTING SLITS IN TUNNEL LININGS
August F. Starkle, Jegenstorf, Switzerland, assignor to Walter J. Heller A.G., Bauunternehmung, Switzerland
Filed May 1, 1969, Ser. No. 820,877
Claims priority, application Switzerland, June 13, 1968, 8,773/68
Int. Cl. E21c 25/00
U.S. Cl. 299—75                                    9 Claims

ABSTRACT OF THE DISCLOSURE

A cutter having two spaced disc blades and a drive is moved by a chain along two guide members that are curved to follow the cross sectional contour of the lining. The frame supporting the guide members is held in place by jacks pressing against the lining. In a second embodiment, a pair of pivotally mounted arms guide the cutter in its course. Jacks press two driven wheels and the cutter against the lining.

BACKGROUND OF THE INVENTION

The invention relates to a device for cutting two spaced, parallel slits in tunnel linings for making gaps therein, the device including a cutter, a drive for causing the cutter to cut, means for guiding the cutter over the tunnel lining in a direction crosswise to the tunnel length, and wheels for moving the device along the length of the tunnel.

When the tunnel walls are lined with concrete, care must be taken that the lining incorporates a series of spaced gaps extending crosswise to the tunnel. These gaps prevent the formation in the concrete of uncontrollable cracks that would extend themselves in all directions. They constitute intentional weak spots in the lining, so that when the latter is stressed, as by temperature changes, the cracks, in all likelihood, will occur along the gaps.

Harmful consequences, such as water entering the tunnel through the cracks, are avoided by filling the gaps with a rubbery synthetic plastic. Till now, the gaps were made by cementing in place a suitably shaped strip, usually of wood, while forming the lining, and then removing the strip once the concrete had set, leaving a groove that constitutes the gap. A great deal of time is consumed setting the strips in place before concreting and subsequently removing the strips after the concrete has set. There is, moreover, the danger, unless the work is done very carefully, that the lining will be damaged when the strips are taken out.

SUMMARY OF THE INVENTION

The purpose of the invention is to provide a device for cutting at least two spaced, parallel slits in the set concrete, whereby the aforementioned strips are superfluous, thereby saving an appreciable amount of time.

BRIEF DESCRIPTION OF THE DRAWINGS

The invention will be described, with reference to the figures of the drawings, wherein FIGS. 1 and 1a are a complete transverse section of a tunnel with the device of the invention installed therein;

FIG. 2 is a view, on enlarged scale, taken along line II—II of FIG. 1;

FIG. 3 is an end-on view of a second embodiment of the invention;

FIG. 4 is a side view of the embodiment shown in FIG. 3; and

FIG. 5 is a top view of the support, and of the cutter and the drive wheels mounted thereon.

DESCRIPTION OF THE PREFERRED EMBODIMENTS

FIGS. 1 and 1a together show the transverse section blasted out of the rock 1. The tunnel walls and roof are provided with a thick concrete lining 2. Temporary rails 4 are arranged along the tunnel floor 3. The rails rest on H-section supports 5 supported by concrete embankments 6. The rails serve originally to move and support the forms (not shown) for the concrete lining. A drainage canal 7 for water runs along the middle of the tunnel floor.

A framework 8, consisting of pipes 9, forming an arch, connected to struts 10, rests on two H-sections 11 that are each supported by two wheel cases 12. Each case holds a wheel 13, the two flanges of which embrace the rail 4. While the device of the invention is operating, workers or material can move through the passage 14 formed by the pipes 9.

A guide bar 15, curved to follow the cross sectional shape of the tunnel lining 2, and a guide rail 16, concentric with the bar 15, are held spaced apart by connectors 17 that are U-shaped in cross section. Each group of four adjacent outer ends of the struts 10 nearest the tunnel lining is fastened together by a respective joint 18 (see FIG. 2), all of these joints being rigidly connected together by a series of P-section supports 19, to which the connectors 17 are secured.

A hydraulic jack 20, having a piston (not shown) that acts on a pressing head 21, is mounted at each joint 18. The device of the invention can be securely held at any position inside of the tunnel with the help of these jacks. Lines 23 supply hydraulic oil from a pressure regulator 22 to the jacks for operating the heads 21.

On a frame 24 are mounted supporting rollers 25 that partly surround the guide bar 15 and stabilizing rollers 26 that partly surround the guide rail 16. This frame further mounts an electric motor 27 that drives two circular cutting blades 28 through V-belts 33. The motor 27, the shaft 30 rigidly connected to the blades 28, and the shaft bearings 29 constitute a unit that can be moved along a radius on a guide spindle 31 by means of a threaded rod 32, whereby the slit depth can be adjusted as desired. There are two pairs of supporting rollers 25, but a single pair of stabilizing rollers 26 is sufficient to prevent the cutter from swinging about the axis of the guide bar 15.

An endless chain 34 advances the frame 24 and cutter along the guide bar 15. The connector 17 at each end of the bar 15 mounts a sprocket wheel 35. The remaining connectors 17 incorporate chain guide wheels 36, which ensure that the chain runs approximately tangentially to an imaginary curve that is parallel to the curve of the bar 15. A link 37 of the chain 34 is connected to the frame 24 by a bracket 38. The left sprocket wheel 35 (as viewed in FIG. 1) is connected to the shaft of a drive motor 39. When the motor shaft is turned counterclockwise, the cutter is moved counterclockwise along the guide bar 15, cutting two slits 40 in the concrete lining 2. Electrical power and cooling water for the cutter are respectively supplied through a cable 41 and a hose 42. Some of the connectors 17 have a guide roller 43 (of which only one is shown in FIG. 1a to keep the figure simple) for the cable and the hose.

The required length of the cable and hose depends on the position of the cutter. The unused length is wound up on the drums 44 and payed off as needed.

A second embodiment of the invention is shown in FIGS. 3 to 5. The device includes a chassis 65 supported by four wheel cases 12 incorporating the wheels 13. An axle 45 is centered above the wheel boxes and extends parallel to the direction of movement of the chassis 65. The chassis is so constructed that it supports the axle 45"

substantially in the center of the tunnel cross section. Two arms 46 are mounted free to swing on the axle 45, the upper ends of these arms being welded to a cross beam 47, which mounts two hydraulic jacks 48 with their pressing heads 49. A frame-like support 50 is pivotally connected to the upper ends of the heads 49, so that the support can be tilted along its lengthwise axis while its transverse axis remains perpendicular to the arms 46.

Two jack wheels 51, for pressing against the tunnel lining 2, are mounted on the outer face of the support 50 opposite respective pressing heads 49. The frame 24, carrying the adjustable cutter consisting of the motor 27, the bearings 29, and the cutting blades 28 (as illustrated in FIG. 2), is mounted between the wheels 51 and partly within the support 50. A drive motor 52 is also mounted on the support. The latter also carries a drive shaft 53, which is driven by the shaft of the motor 52 through two sprocket wheels 54 and a chain 55. The rotation of the drive shaft 53 is transmitted to the axles of the wheels 51 by a respective sprocket 56, fixed on the shaft 53, chains 57, and large sprocket wheels 58. The wheels 51 have rubber tires to provide a smooth and satisfactory advance of the cutter.

The weight of the arms 46, the support 50, and of the cutter is balanced by two counterweights 59 located at either end of the axle 45 and slidable on arms 60 rigidly attached to the axle. These counterweights enable the cutter to be pivoted about the axis of the axle 45 by the application of very little force.

Two brake pressure plates 61 are mounted rotationally rigid on the axle 45. Two braking arrangements 62, cooperating with the plates, are arranged on the chassis 65. These braking arrangements are so connected by a hydraulic unit (not shown) to the jacks 48 that, when the pressure in the jacks for any reason falls below a certain value, the plates 61 are locked in place, thereby preventing further turning of the axle 45. This prevents the cutter from jamming in its last position, if the hydraulic jack pressure fails and the frictional connection is lost between the support 50 and the tunnel lining 2.

This embodiment has the advantage that the slit depth is uniform over the entire length of the slit, even though the tunnel lining is not uniformly spaced from the axle 45. A further feature of the embodiment is that a long chain, given to vibrating, is not required to move the cutter over the lining. Moreover, the cable for supplying electrical power to the motors 27 and 52, and the hose for furnishing cooling water for the cutting blades, can be more simply arranged. The fact that the drive for the wheels 51 is simple and next to the wheels ensures a satisfactory cutting of slits in either turning direction of the arms 46.

While the device is operating, workers and material are free to move past it, either on the left or right hand side of the chassis 44, depending on which side the arms 46 are located.

Brakes (not shown) are provided to lock the wheels 13, in order to prevent movement of the chassis 44 while the device is in operation.

The width of the gap is approximately 4 cm. The cutting blades 28 are considerably thinner than this, and are held spaced apart by a spacer 63 that ensures that the distance between the outer surface of one blade and that of the other is equal to the width of the gap. After the two slits have been cut, the gap is finished to its final form by removing the resulting concrete rib 64, using any appropriate means.

Once the slits have been cut, the cutter is removed from the lining 2 by turning the threaded rod 32. The wheels 51 are then driven to raise the arms 46 to their vertical position; and the hydraulic jack pressure is released, causing the brakes 61 and 62 to lock the arms in position. The device can now be advanced on the rails 4 to the next position at which a gap is to be made.

Although the preferred embodiments of the invention have been described, the scope of, and the breadth of protection afforded to, the invention are limited solely by the appended claims.

What is claimed is:

1. A device for cutting at least two spaced, parallel slits in curved linings for the aforesaid purpose, including a cutter (27, 28, 29), a first drive (27, etc.) for operating said cutter means, (15, 25, 16, 26 or 45, 46, 51) for guiding said cutter over the tunnel lining in a direction crosswise to the tunnel length, and wheels (13) for moving the device along the length of the tunnel, and wherein the imrpovement comprises a second drive (39. etc. or 52, etc.) for moving said cutter over the tunnel lining in a direction crosswise thereto, said second drive operating at least approximately tanegentially to an imaginary curve that is parallel to the curve of said guide means, and means (31 or 48) for pressing against the tunnel lining to stabilize said cutter with respect to the lining.

2. The device as defined in claim 1, wherein the device embodies a passage extending upwards from the tunnel floor for the free movement of workers and material past the device in a tunnel.

3. The device as defined in claim 2, including a framework (8) supported by said wheels and definining said passage centrally with respect to the tunnel cross section, and wherein said guide means and pressing means are mounted on said framework, and said pressing means comprises a plurality of spaced hydraulic jacks ( 20, 21) that extend radially with respect to the tunnel cross section for pressing against the tunnel lining and holding the device at a desired position along the length of the lining.

4. The device as defined in claim 3, including a guide bar (15) and a guide rail (16) incorporated by said guide means, said bar and rail being concentric, spaced apart, and curved to follow the cross sectional shape of the tunnel lining, at least one pair of opposed supporting rollers (25) engaging and partly surrounding said guide bar in a radial direction, as defined by the bar curve, for guiding the movement of said cutter over the tunnel lining, and at least one pair of opposed stabilizing rollers (26) engaging and partly surrounding said guide rail in a plane at right angles to the bar radial direction for preventing said cutter from swinging about said guide bar.

5. The device as defined in claim 44, wherein said cutter is connected to said supporting and stabilizing rollers, and said second drive includes a motor (39) and an endless, flexible means (34) connected to said cutter and moved by said motor in a closed path confined between said guide bar and guide rail for causing said cutter to move over the tunnel lining, and including means (31, 32) for moving said cutter along the bar radial direction, whereby to move the cutter towards and away from the lining.

6. The device as defined in claim 2, wherein said pressing means (48) presses said cutter against the tunnel lining.

7. The device as defined in claim 6, including a chassis (44) supported by said wheels, and wherein said guide means includes an axle (45) mounted on said chassis, at least one arm (46) mounted on said axle free to swing thereabout, a support (50) associated with the end of said arm remote from said axle, a pair of spaced wheels (51), mounted on said support, to be pressed against the tunnel lining, said cutter being mounted on said support between said wheels, and a hydraulic jack (48) connected between said support and the neighboring end of said arm for pressing said wheels and cutter against the tunnel lining.

8. The device as defined in claim 7, including means (53, 57, 58, etc.) for connecting said second drive to said wheels to move said cutter over the tunnel lining when the latter is contacted by said wheels.

9. The device as defined in claim 8, including an adjustable counterweight (59) for balancing the weight of said arm, and a brake (61, 62) for automatically locking said arm in position when the hydraulic jack pressure falls below a given value.

References Cited

UNITED STATES PATENTS

| | | | |
|---|---|---|---|
| 1,297,082 | 3/1919 | Brown | 61—45UX |
| 2,385,251 | 9/1945 | Ayers | 61—45X |
| 3,378,307 | 4/1968 | Dempsey et al. | 299—75 |

FOREIGN PATENTS

| | | | |
|---|---|---|---|
| 1,092,912 | 11/1967 | Great Britain | 299—33 |

DENNIS L. TAYLOR, Primary Examiner

U.S. Cl. X.R.

61—45, 63